United States Patent Office 2,873,684
Patented Feb. 17, 1959

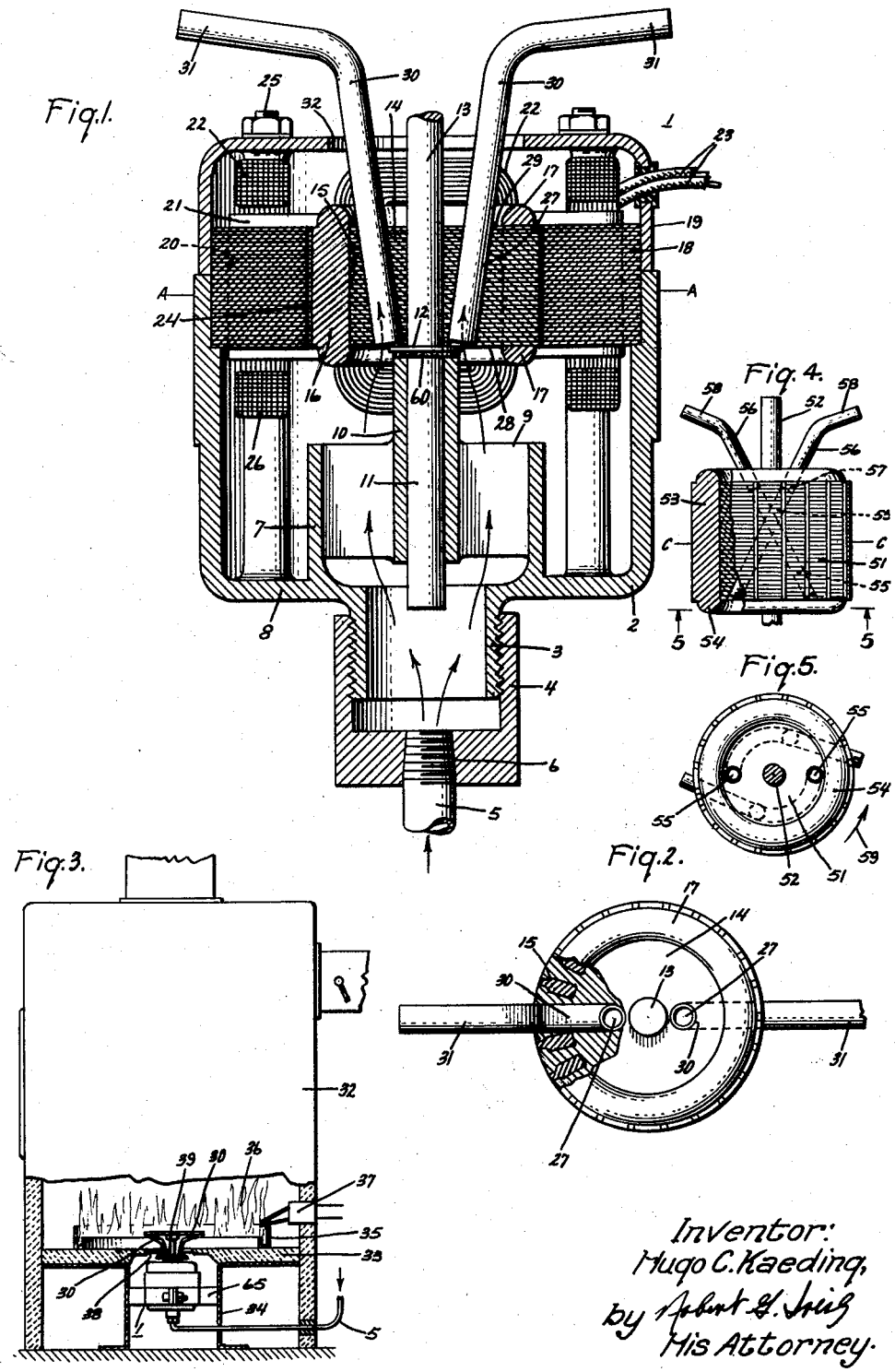

2,873,684
PUMP MOTOR ASSEMBLY

Hugo C. Kaeding, Fort Wayne, Ind., assignor to General Electric Company, a corporation of New York Application March 27, 1956, Serial No. 574,224

2 Claims. (Cl. 103—87)

This invention relates to pumping apparatus, and more particularly to pumping apparatus provided in an integral construction with the dynamoelectric machine providing the motor power therefor.

In view of the many applications for pumping apparatus driven by electric motors, it becomes a matter of considerable importance to provide an assembly which is as economical and simple to manufacture as possible. One example of such an application lies in the field of liquid fuel burners where pumping apparatus is used to move the fuel to the location at which combustion is to take place. Such apparatus is expected to operate for many years without requiring any adjustment or repair, yet, in order to help keep the price of the burner down, it is imperative that the assembly be one which is economical to manufacture. In general, the greater the integration of the pumping apparatus with the electric motor, the more compact will be the assembly and, in view of the fact that fewer parts are required as the integration of the components becomes greater, the assembly tends to become more economical to manufacture. Accordingly, it is most desirable to provide a highly integrated structure having a relatively simple construction which is economical to manufacture and is unlikely to require repairs on it during the useful life of the device. While such apparatus is particularly desirable in the field of liquid fuel burners, it is also susceptible of advantageous use in many other fields, and therefore the invention which is to be described herebelow is not to be deemed limited to one particular application.

It is, therefore, an object of this invention to provide a pump motor assembly having the desirable features set forth above.

A further object of this invention is to provide an improved rotatable dynamoelectric machine member for use in the improved apparatus of the invention.

In its broader aspect, the invention provides an electric motor including a stator, and a rotor mounted in concentric and rotatable relation therewith. The rotor is provided with a passage which extends from end to end in spaced relation to the rotor shaft, and pipe means are arranged in cooperative relation to the passage to extend it. At least one of the passages and the pipe means is arranged in pumping relation to a fluid during rotation of the rotor so as to cause the fluid to be pumped through the passage and the pipe means.

The features of the invention which are believed to be novel are set forth with particularity in the appended claims. The invention itself, however, both as to its organization and method of operation, together with further objects and advantages thereof, may best be understood by reference to the following description taken in connection with the accompanying drawing.

In the drawing, Figure 1 is a sectional side view of the improved apparatus of the invention;

Figure 2 is an end view, partly broken away and partly in cross section, of the improved rotatable dynamoelectric machine member of the invention;

Figure 3 is a side view, partly broken away and partly in cross section, of a liquid fuel burner utilizing the improved apparatus of this invention;

Figure 4 is a side view of modified form of the dynamoelectric machine rotatable member; and Figure 5 is a view along line 5—5 in Figure 4.

Referring now to Figures 1 and 2 of the drawing, there is shown a pump motor assembly, generally indicated at 1, which includes a housing member 2 having a threaded neck portion 3 arranged in threaded engagement with internally threaded member 4. A supply pipe 5 is arranged in opening 6 of member 4 so as to feed a fluid, such as liquid fuel, in the direction shown by the arrows. When the assembly 1 is in position for use, the fuel is preferably metered so that it rises substantially to the level shown at A—A thereby to cover part of the dynamoelectric apparatus to be described. A circular flange extends in front end 8 of member 2 and is provided with an inwardly extending spider 9 so as to support a unit type sleeve bearing 10, which is provided at one end with a suitable washer arrangement 60 for thrust bearing purposes. Rotatably arranged within bearing 10 is a shaft 11 which has a flange 12 provided so as to position the shaft in a vertical position in predetermined axial relation to bearing 10.

The upper portion 13 of shaft 11 is centrally secured within a dynamoelectric machine rotatable member 14 formed in the customary manner from a stacked plurality of thin laminations of magnetic material. Member 14 is provided in the standard manner with a plurality of slots 15 extending axially therethrough. Conductors 16 are provided in each slot, as by casting for instance, and the conductors are short-circuited together at their ends by end rings 17 to form a standard squirrel cage winding.

A stator member 18, also formed in the standard manner from a stacked plurality of thin laminations of magnetic material, is secured within housing member 2 and within a housing member 19 which is arranged in cooperative relation to the housing member 2 so as to substantially to enclose the assembly. Stator member 18 is provided with slots 20 which are lined with slot liners 21, and electrical coils 22 are arranged within the slots. A pair of leads 23 are provided so as to connect the coils 22 across a suitable source of alternating current power. The stator member 18 and the rotor member 14 together form an induction motor, with member 14 acting as a rotatable secondary member when power is supplied to coil 22 through leads 23. The entire apparatus is secured together in proper concentric relationship, with air gap 24 provided between stator member 18 and rotor member 14, by any desired means such as through bolts 25.

It will be observed that when fuel is supplied up to line A—A, the lower portion 26 of the windings, part of core members 14 and 18, and bearing 10 are submerged in the liquid. Thus, the liquid serves the purpose of cooling the coils 26 and the cores 14 and 18, as well as effecting a lubricating action for the bearing 10.

A pair of passages 27 are provided in member 14 each being radially spaced from shaft portion 13 and extending from one end of the member to the other. Each passage is so formed that the radial distance from the axis of rotation of member 14 increases from end 28 of the member to end 29 thereof. Securely arranged within each passage 27 is a pipe member 30 which extends out of the top of the passage through an opening 32 in housing part 19 so as to form an extension of the passage. Each pipe member 30 is, in the present embodiment, provided with a portion 31 extending almost horizontally outwardly. Thus, as illustrated in the drawing, each pipe member 30 is arranged in the passage communicating substantially from the end of the rotor, which is immersed in the liquid, to a point beyond the housing member 19 for a purpose to be described herebelow.

When power is supplied to coil 22 through leads 23, rotor member 14 will rotate in the normal manner of an induction motor secondary member. Rotation of this member will cause a centrifugal force to be applied to the fuel within passages 27. The fuel will seek to move outwardly from the center of rotation and, consequently, when the speed of rotation is sufficient, will move upwardly through each pipe 30 and out through portion 31 of the pipe. In this manner, the fuel will be pumped up at a rate which is determined by the size of the passages, the amount of centrifugal force which is effective to move the fuel as a result of the shape and direction of the passages, and the height at which the fuel is maintained, that is, the amount of fuel upon which the centrifugal force will act at any one instant. It will, of course, be understood that while two passages 27 have been shown, the number of passages is not an essential part of the invention, and a single passage may be used or any desired plurality of passages may be used. In addition, while the passages have been formed in the present embodiment so as to effect a centrifugal force upon fuel which is above the level of the bottom of the passages, it will be understood that the essential feature lies in the provision of a passage and pipe assembly which will effect a pumping action on a fluid, and that, as will be shown below, this may be effected by constructions other than the precise construction illustrated in Figure 1.

Referring now to Figure 3 of the drawing, there is shown a liquid fuel burning furnace 32 having a fire wall 33 supported by a bracket member 34. Bracket 34 also includes a horizontal portion 65 in which the motor 1 is secured. Above the fire wall 33 there is provided an annular trough 35 containing burning fuel as shown by flames 36. Suitable apparatus 37 may be provided for initiating the combustion. In order to provide an even supply of fuel to all parts of trough 35, the fuel is supplied through pipes 30 in the manner described in connection with Figures 1 and 2. The rotation effects the pumping action and as the fuel passes out through pipes 30, the rotation also causes the fuel to be distributed around the trough. The speed of rotation and the size and arrangement of the pipes are such that the fuel will pass through the air until it lands in the trough. Pipes 30 extend through an opening 38 in the fire wall provided for that purpose. Undesirable radiation from flames 36 may be prevented from reaching the internal parts of the assembly 1 by a shield 39 secured to the shaft portion 13 and to the pipes 30 so as to rotate therewith.

It will be seen from Figure 3 that the assembly of Figures 1 and 2, when arranged in a liquid fuel burning apparatus such as 32, provides an efficient method of providing heat inasmuch as the fuel is provided evenly and in the quantities desired. It will further be observed that the motor is cooled by the fuel it pumps and that the bearing for the motor is lubricated by the fuel. Thus the simple construction set forth in Figure 1 not only provides an effective and simple pump motor construction but also provides one in which the pumped fuel is utilized for cooling and lubrication purposes.

Referring now to Figures 4 and 5, a second embodiment of the invention will be described. As before, a rotor 51 formed of a stacked plurality of thin laminations of magnetic material is provided, with a centrally arranged shaft 52 secured therein and a plurality of conductors 53 extending axially through the rotor and joined therein by end rings 54. A pair of substantially axially extending openings 55 are provided. These passages are formed so as to be equally distant radially from shaft 52 along their length, but so as to be skewed with respect thereto. That is, the passage 55 is spiraled about the shaft 52 as it extends from one end of the rotor to the other. This particular shape of the passages 55 may be best understood from an examination of Figures 5 and 6 together. Each passage 55 has a pipe 56 with one end 57 thereof secured in the upper end of the passage. The outer end of each pipe 56 may be formed as shown at 58 in the same manner as portion 31 of pipe 30 in Figure 1. In the embodiment of Figures 4 and 5 it is intended that the rotor member be submerged in the fluid to be pumped to a predetermined depth such as that shown by line C, in a manner similar to the arrangement of Figure 1. In order to effect pumping action on the fluid, the rotor member 51 is rotated at a predetermined speed in substantially the same manner as set forth in connection with rotor member 14 in Figure 1. In the case of the embodiment of Figures 4 and 5, the direction of rotation must be predetermined, i. e., in a direction opposite to the arrangement of passages 55 as viewed from the bottom end of rotor 51 as indicated by arrow 59 in Figure 5. This will cause the fluid to be pumped to push against the fluid already in the passages 55 with a pressure which will increase with the speed until the pressure is such as to force the fluid out through portion 58 of each pipe in the desired manner. It will be observed that the embodiment of Figures 4 and 5 does not use centrifugal force to effect the pumping action to force the fluid through passages 55 (although, of course, the fluid is subject to centrifugal force when it reaches pipes 56) but, rather, uses the force developed as a result of the angle of the passages and the direction of rotation. While a relatively high speed of rotation is required in the case of the embodiment of Figures 4 and 5, it is not such a velocity as would put it outside the range of normally commercially accessible motors. In addition, the fact that openings 55 may be spiraled about the shaft 52 without any change in the radial distance from the shaft permits a construction which is highly economical.

It will be seen from the two foregoing embodiments that the applicant's invention provides a pump motor arrangement whereby the pumping action is effected by means of an extremely simple modification of the motor structure. In addition, the general structure of the assembly shown in Figure 1 indicates that the construction has the further advantages that the fluid pumped may be used for cooling and lubricating purposes. Each embodiment permits a high degree of economy to be achieved inasmuch as the pumping is effected simply by the provision of a pipe and passage assembly which may be formed in a standard rotor without the requirement either for extra pumping apparatus, or for any costly modifications of the rotor. In each embodiment, the passages in the rotor are at a definite predetermined radial distance from the shaft at all points so as to be entirely independent thereof and thus avoid costly modifications of the securement of the shaft within the rotor.

It will further be understood that while two specific embodiments have been shown, the fundamental feature of the invention lies in the provision of at least one passage axially extending through the rotor entirely independent of the rotor shaft which is combined with a pipe connected to the passage so as to be effective to pump fluid during rotation of the rotor. Therefore, while the invention has been explained by describing particular embodiments thereof, it will be apparent that improvements and modifications may be made without departing from the scope of the invention as defined in the appended claims.

What I claim as new and desire to secure by Letters Patent of the United States is:

1. An electric pump-motor assembly including a motor casing, a stator having a coil formed therein, a shaft, and a rotor mounted on said shaft in concentric and rotatable relation to said stator, unit bearing means at one end of said rotor rotatably mounting said shaft, said motor having its axis of rotation substantially vertical with said bearing means below said rotor, said rotor and said stator being adapted to have one end immersed in a liquid and said bearing means being adapted to be immersed in the liquid, said rotor having a plurality of substantially axially extending slots formed therein adjacent the periphery thereof, windings positioned in said slots, said rotor further having a passage formed therein extending from one end thereof to the other in radially spaced relation to said shaft and being spaced between said shaft and said slots, said passage being open to said liquid at its lower end and being formed to pump said liquid during rotation of said rotor, and unitary pipe means arranged in said passage communicating substantially from said end of the rotor immersed in liquid to a point beyond said motor casing, thereby causing liquid to be pumped during rotation of the rotor from said end of the rotor beyond said motor casing without substantial leakage of liquid in said rotor during such pumping action.

2. An electric pump-motor assembly including a motor casing, a stator having a coil formed therein, a shaft, and a rotor mounted on said shaft in concentric and rotatable relation to said stator, unit bearing means at one end of said rotor rotatably mounting said shaft, said motor having its axis of rotation substantially vertical with said bearing means below said rotor, said casing being adapted to confine a quantity of liquid, said rotor and said stator being adapted to have one end immersed in a liquid and said bearing means being adapted to be immersed in the liquid, said rotor having a plurality of substantially axially extending slots formed therein adjacent the periphery thereof, windings positioned in said slots, said rotor further having a plurality of passages formed therein extending from one end thereof to the other in radially spaced relation to said shaft and being spaced between said shaft and said slots, said passages open to said liquid at the lower end and being formed to pump said liquid during rotation of said rotor, and pipe means arranged in said passages, communicating substantially from said end of the rotor immersed in liquid to a point beyond said motor casing and being bent externally of said motor casing, thereby causing liquid to be pumped and distributed during rotation of the rotor from said end of the rotor beyond said motor casing without substantial leakage of liquid in said rotor during such pumping action.

References Cited in the file of this patent

UNITED STATES PATENTS

| | | |
|---|---|---|
| 622,474 | Hoskin | Apr. 4, 1899 |
| 752,168 | Holzwarth | Feb. 16, 1904 |
| 1,040,543 | Hughes | Oct. 8, 1912 |
| 1,074,043 | Breuer | Sept. 23, 1913 |
| 1,238,292 | Hellmund | Aug. 28, 1917 |
| 1,578,333 | McNiff et al. | Mar. 30, 1926 |
| 2,181,249 | Powers | Nov. 28, 1939 |
| 2,310,333 | Wilson et al. | Feb. 9, 1943 |
| 2,544,907 | Wilson | Mar. 13, 1951 |
| 2,592,612 | Smith | Apr. 15, 1952 |
| 2,625,213 | Smith et al. | Jan. 13, 1953 |
| 2,641,189 | Haugen | June 9, 1953 |
| 2,747,512 | Fouche | May 29, 1956 |

FOREIGN PATENTS

| | | |
|---|---|---|
| 272,374 | Switzerland | Mar. 1, 1951 |
| 286,224 | Switzerland | Feb. 2, 1953 |